March 11, 1952  C. W. MICHATEK  2,589,016
AUTOMATIC ROUND HEAD SCREW STICK DRIVER
Filed Sept. 23, 1948  3 Sheets-Sheet 1
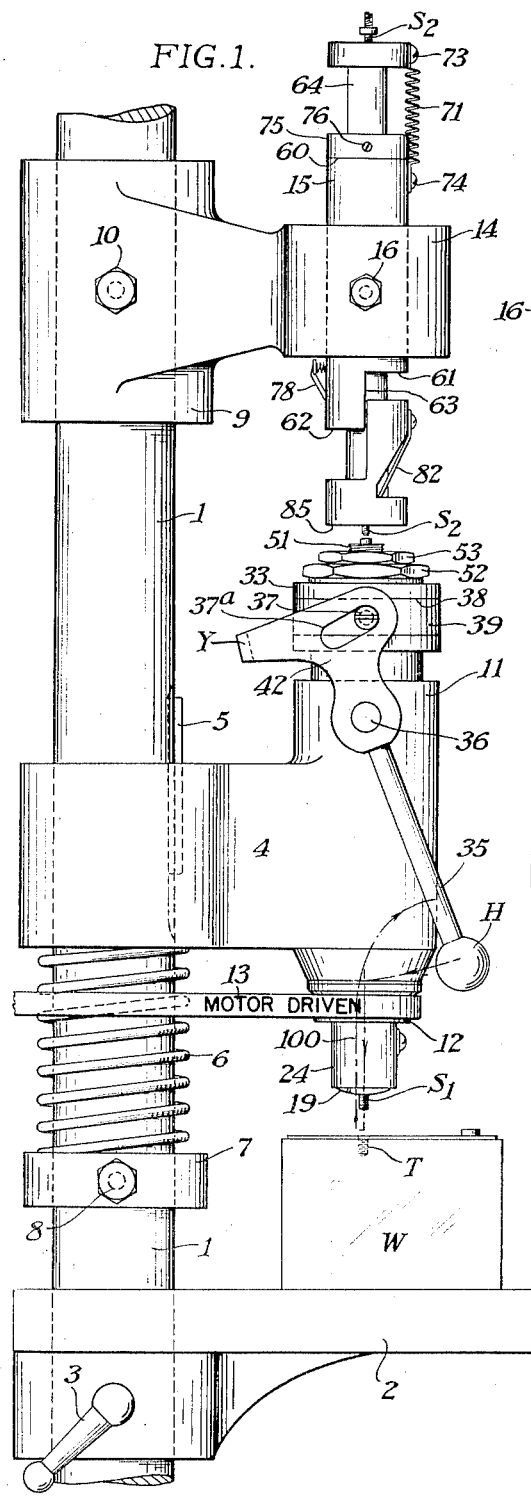
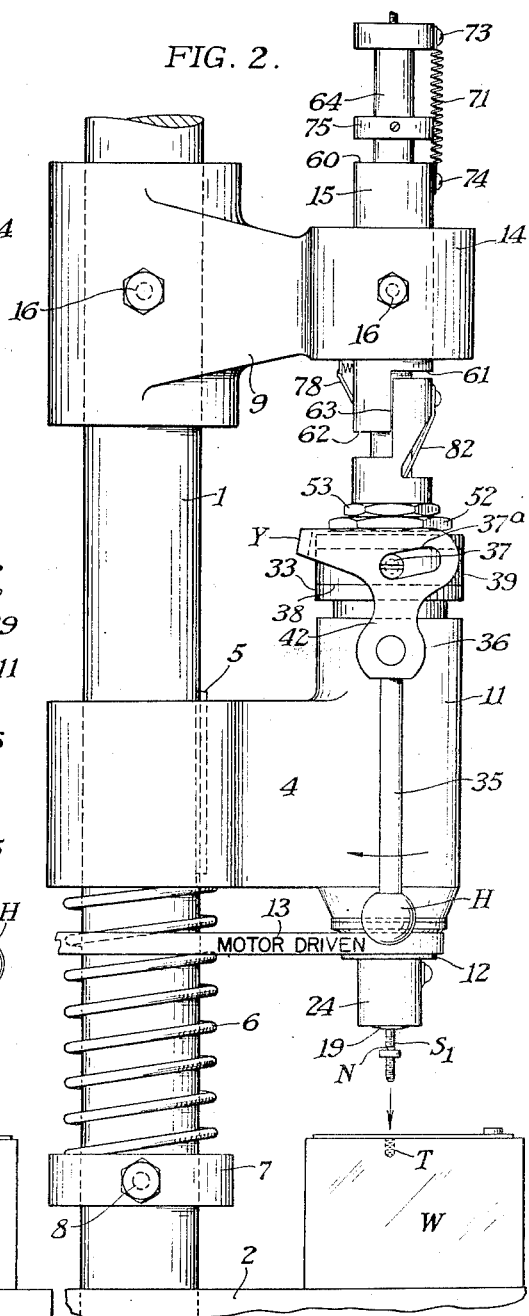
CHESTER W. MICHATEK
INVENTOR
BY
ATTORNEYS March 11, 1952 C. W. MICHATEK 2,589,016
AUTOMATIC ROUND HEAD SCREW STICK DRIVER
Filed Sept. 23, 1948 3 Sheets-Sheet 2

CHESTER W. MICHATEK
INVENTOR
BY
ATTORNEYS

March 11, 1952     C. W. MICHATEK     2,589,016
AUTOMATIC ROUND HEAD SCREW STICK DRIVER
Filed Sept. 23, 1948     3 Sheets-Sheet 3
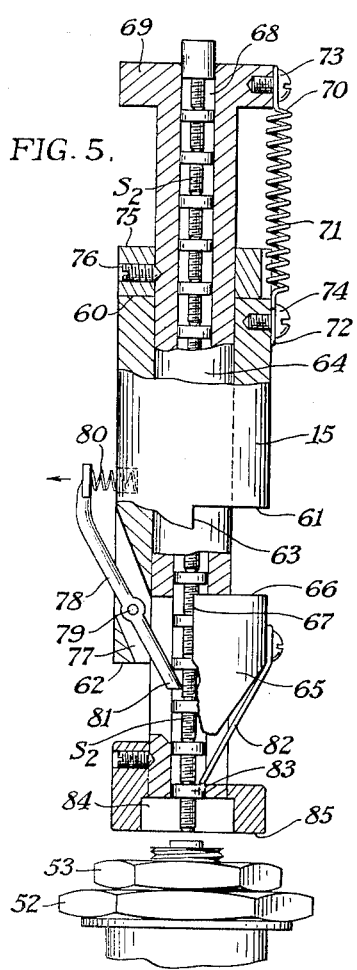
FIG. 5.
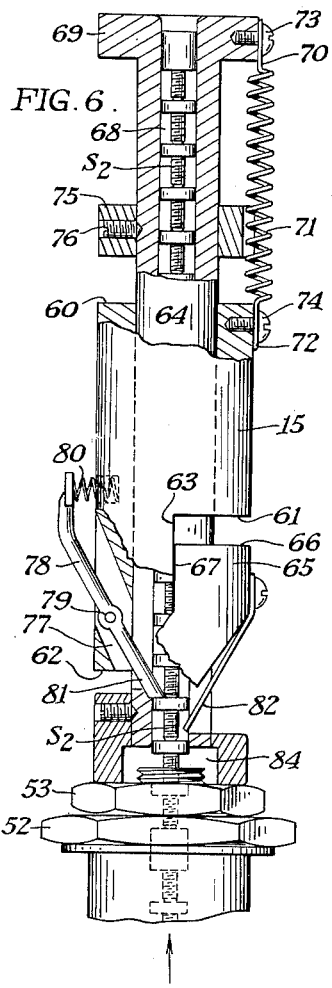
FIG. 6.
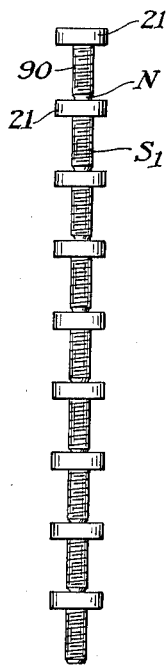
FIG. 7.
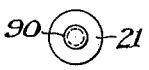
FIG. 8.
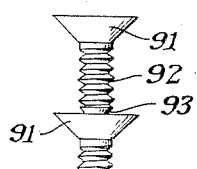
FIG. 9.
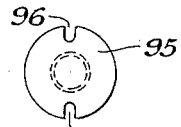
FIG. 10.
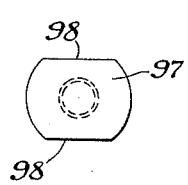
FIG. 11.
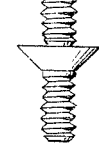
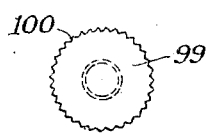
FIG. 12.
CHESTER W. MICHATEK
INVENTOR
BY
ATTORNEYS Patented Mar. 11, 1952

2,589,016

UNITED STATES PATENT OFFICE 2,589,016

AUTOMATIC ROUND HEAD SCREW STICK DRIVER

Chester William Michatek, Rochester, N. Y., assignor to Eastman Kodak Company, Rochester, N. Y., a corporation of New Jersey Application September 23, 1948, Serial No. 50,743

16 Claims. (Cl. 144—32)

This invention relates to screw-driving machines, and particularly to power-driven screw-driving machines for driving unslotted screws of a screw stick into work. One object of my invention is to provide a machine for rapidly driving a plurality of screws into work. Another object is to provide a machine of the class described with means for engaging and driving unslotted round-head screws of screw sticks, as well as screw heads of other forms, preferably modifications of round heads. Another object is to provide a machine of the class described with a simple manual control. A still further object is to provide a manual control for moving a screw to and from work and for automatically advancing a fresh screw into driving position at each actuation of the driver. Still another object of my invention is to provide a means for holding screw sticks accurately at right angles to the screw head gripping means to enable countersunk heads having relatively sharp or narrow outer peripheries to be successfully gripped and driven. Other objects will appear from the following specification, the novel features being particularly pointed out in the claims at the end thereof.

This invention relates to a machine particularly designed for driving an end screw of a screw stick into work. Screw sticks are known, being shown in U. S. Pat. 2,247,499, Hutchison, July 1, 1941; U. S. Pat. 2,289,785, Hutchison, July 14, 1941. My screw-driving machine is designed to drive an end screw into work by applying a torque to the head of a screw adjacent the screw being driven into work. The screw is turned until a narrow neck connecting it to the next-adjacent screw is twisted off after the driven screw is seated. This machine is for an improvement over the screw stick driving machines shown in U. S. Pat. 2,247,500, Hutchison, July 1, 1941; U. S. Pat. 2,327,795, Hutchison, Aug. 24, 1943; U. S. Pat. 2,327,796, Hutchison, Aug. 24, 1943. My machine is particularly designed to drive screw sticks having round or substantially round heads, such as button head, countersunk head, flat head, oval head, binding head, fillister head, and the like. It may also successfully drive many variations from these heads where modifications of the round form are desired, such as a round head screw having one or more notches (usually for removing the screws), serrated screws, and even screw heads having a plurality of sides, although it is generally better to drive a multisided head with a complementary-shaped socket driver as shown in the Hutchison patents above cited.

Coming now to the drawings wherein like reference characters denote like parts throughout:

Fig. 1 is a side elevation of a power-operated screw stick driver constructed in accordance with and embodying a preferred form of my invention. The parts are shown in a partially raised position with the screw out of contact with the work;

Fig. 2 is a view similar to Fig. 1, but with the parts shown in a screw stick advancing position, just before the screw driver is moved downwardly and into contact with the work;

Fig. 5 is an enlarged fragmentary section shown partially in elevation of the screw-advancing mechanism removed from its support; in this view the screw stick has been advanced;

Fig. 6 is a view similar to Fig. 5 but with the screw driver contacting with the screw-advancing mechanism so that the screw stick of the latter will advance a screw in the screw driver;

Fig. 7 is a side elevation of a portion of a typical screw stick which may be used with the screw-driving machine shown in the preceding views;

Fig. 8 is a bottom plan view of the screw stick shown in Fig. 7;

Fig. 9 is an enlarged fragmentary detail of a screw stick showing in side elevation a portion of a screw stick with a different type head from that shown in Fig. 7;

Figure 3:
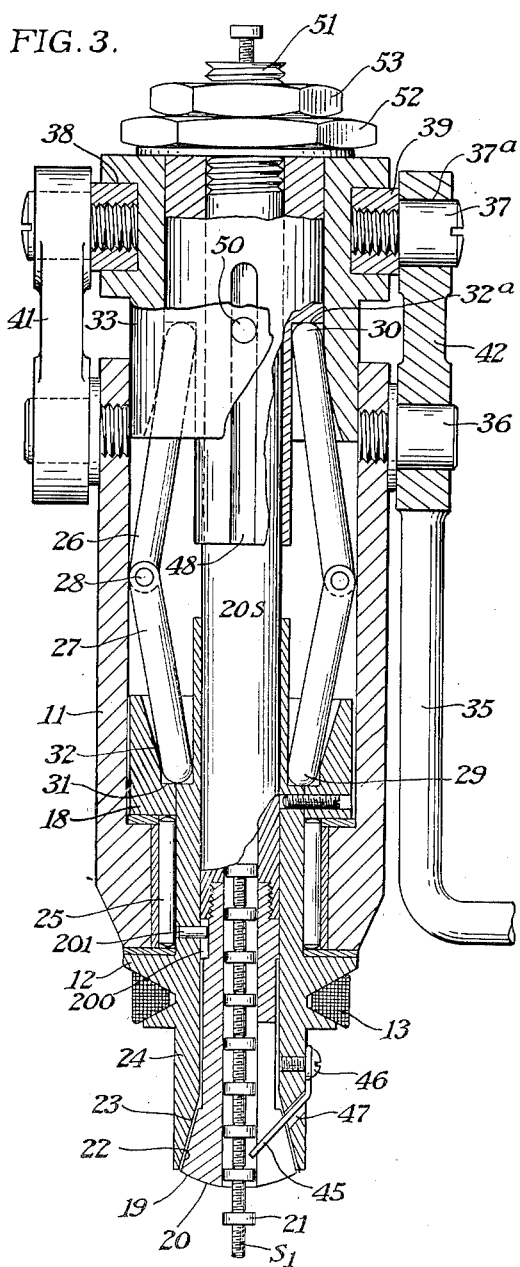
Fig. 3 is an enlarged vertical section, parts being shown in elevation, illustrating the screw driver portion of the machine removed from its support; the parts being shown in a position to permit sliding movement of the screw stick relative to the driver.

Figs. 10, 11, and 12 are plan views of different types of screw heads which may be used with my improved screw-driving mechanism.

The invention may be described briefly as a screw stick driving machine having a support slidably carrying a screw driver for driving screws from a screw stick into work with a collet-like screw stick gripping member, the support also carrying a screw-advancing mechanism in axial alignment with the driver. The advancing mechanism is loaded with a second screw stick intermittently advanced by the screw driver contacting therewith after each driving operation, whereby the advancing mechanism screw stick may contact with, and advance, the screw stick carried by the screw driver. A single handle on the driver locks and unlocks the screw stick holding collet and advances and retracts the screw driver by the operator moving the handle through a simple and easily followed path of movement. The driver preferably rotates continuously while the screw-advancing mechanism remains stationary on the base.

More specifically, my invention may consist of a support which is much like a drill press in that the support comprises an upstanding column 1 carrying a work table 2 adjustable on the column through a locking lever 3. The column may also support a slidable carriage 4 which may move on the spline 5 of the column 1, axially of the column, and which may be held in a normal position by a coiled spring 6 held under the desired tension by a collar 7 which is held in a desired position by the set screw 8. The column 1 also supports a bracket 9 which may be held in the desired position by a set screw 10.

The bracket 4 may form a part of, or may be attached to, a screw-driving element 11; this element holding a screw stick S1 and being adapted to turn the screw stick by rotation through a pulley 12 and belt 13, as will be hereinafter more fully described. The belt 13 may pass around a suitable power drive, such as the pulley of a motor, not shown.

The bracket 9 includes a collar 14 holding a section 15 of the screw-advancing mechanism by means of a set screw 16. The screw-advancing mechanism and the screw driver are separate parts, but, as shown in Fig. 1, they are axially aligned so that by sliding one relative to the other contact between the two is obtained, as is shown in Fig. 2.

The work W may rest on the table 2 with a threaded aperture T axially aligned with the screw stick S1 so that the bottom screw of the stick may be driven into the work by lowering the screw-driving mechanism which can be accomplished by means of a handle H.

Figure 4:
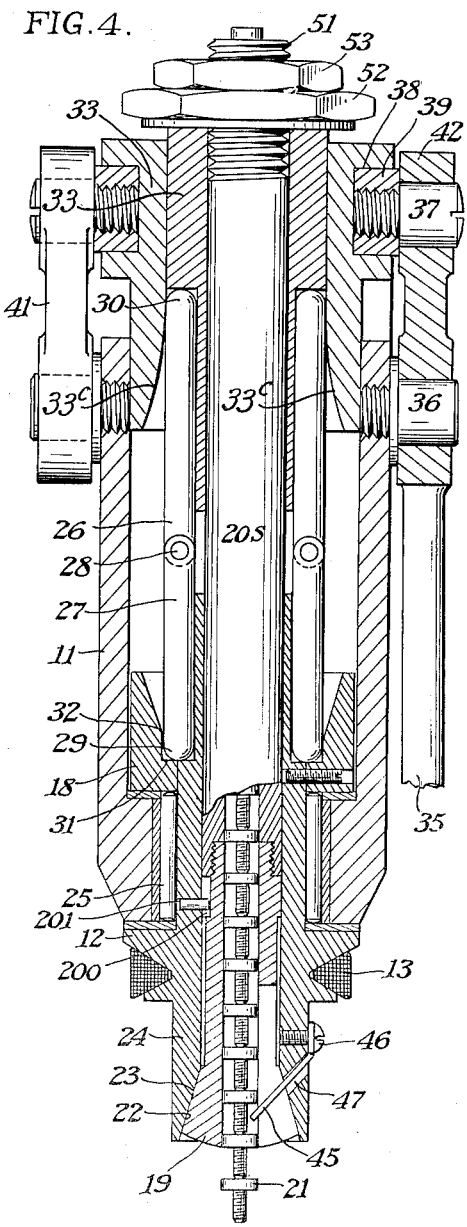
Fig. 4 is a view similar to Fig. 3, but with the parts shown in a screw-gripping, or screw-driving, position.

The screw stick driver, best shown in Figs. 3 and 4, will now be described. This screw stick driver consists of two main parts, one part of which 11 is fixedly mounted with respect to its supporting bracket. The other part 18 which includes the pulley 12 is mounted to rotate in the first-mentioned part when this pulley is turned through the belt 13. This rotation will drive the screw stick S1 into the work, since the screw stick is rotated by the collet head designated broadly as 19. This head is of known type, and includes a number of jaw sections, here shown as three; each of the sections 20 of which may be moved inwardly into a clamping connection with a screw head 21 when a cam surface 22 on the collet jaws are clamped by means of a complemental cam 23 carried by the sleeve 24 as is usual in collets, the spring jaw sections acting against the fixed cam 23 tend to move part 20 axially with respect to part 24 as the jaws tend to separate. The sleeve 24 forms a portion of the second or rotating section of the screw driver. It may rotate on needle bearings 25. Sleeve 20S may move axially with respect to the fixed section 11 through the action of toggle levers 26 and 27 pivoted at 28 and having rounded ends 29 and 30. This movement is limited by a pin 201 in sleeve 24 and a slot 200 in the sleeve 20S. The rounded ends 29 engage in the bottom 31 of a groove 32 formed in the sleeve 24. The rounded ends 30 engage the flanges 32a of a sleeve member 33 which extends up to the top of the fixed member 11. The position of these arms determines whether or not the collet jaws are locking the screw heads against movement. Fig. 3 shows the unlatched position in which the screw stick may slide and in which the toggle arms are in a bent position. Fig. 4 shows the latched position in which the toggle arms are straightened out so as to force the complemental cam surfaces 22 and 23 against each other, closing the collet jaws on the screw stick heads. Cams 33c push the toggle arms 26 inwardly as member 33 moves downwardly and toward sleeve 24 as will be later described.

This relative movement is obtained through axial movement of the sleeve 33 relative to the sleeve 24. This is accomplished as best shown in Fig. 1 by moving the handle H to the direction shown in this figure in which the lever arm 35 has turned about its pivot 36, moving the pin 37 and sleeve 33 by means of a cam slot 37a in sleeve arm 42. In addition, the interengaging collet surfaces 22, 23 always tend to open up due to the spring in the jaws of the collet member 19 and the beveled surfaces 22 and 23. This cam slot is formed in the upper end of arm 42. A ring 39, lying in a groove 38 of the sleeve 33, remains stationary while the sleeve 33 turns with sleeve 20S and sleeve 24. As indicated in Fig. 3, I prefer to also provide a short arm 41 on the opposite side of the driver which will move in the same manner as the upper arm portion 42 which is connected to the arm 35 and the operating handle H of the lever. Levers 41 and 42 are connected by a yoke Y to move together and have similar cam slots 37a. Thus, by swinging the handle H to and from its vertical position shown in Fig. 2, the jaws 19 of the collet are made to engage and disengage the screw heads 21. By moving the handle H vertically without swinging it about pivot 36, it may move the carriage 4 on column 1.

When the screw heads are engaged, as in Fig. 4, by the collet and the parts are positioned as in Fig. 2, the screws are rapidly rotated by the screw driver and downward movement on the handle H brings the end screw of screw stick S1 into contact with the threaded aperture T of the work W, causing the end screw to be driven into work until the head sets on the work and until the narrow neck N, best shown in Fig. 7, is twisted off. When this occurs, the operator must advance the screw stick S1 and this may be done in the following manner. The handle H is used to permit the screw driver to rise and the handle H follows the vertical path upwardly and, during the upward movement, as shown by the line 100 in Fig. 1, the handle is moved to the right with respect to this figure thereby swinging the arm 35 about pivot 36. The spring assists in this upward movement of carriage 4 and as the handle swings to the right, the cooperating cams 22 and 23 are moved axially and the jaws of the collet release the screw stick because the cams 33c have moved toggle links 26 to the Fig. 4 position. However, the screw stick cannot move because of the frictional contact of a spring 45; this spring being attached by a screw 46 to the sleeve 24 and preferably extending through an aperture 47 and between a pair of the collet jaws into the path of the screws, as shown in Figs. 3 and 4. As will be noted from Fig. 3, the sleeve 33 is slotted at 48 to receive a pin 50 carried by the upper section of the screw driver member 11 so that the sleeve 33 can slide on and turns with parts 24 and 20S. As the screw driver is moved upwardly by the handle H assisted by the spring 6, the uppermost portion—the threaded tube 51—moves toward the screw-advancing mechanism which will be hereinafter more fully described. The nuts 52 and 53 permit longitudinal adjustment of the sleeve 33 relative to the rotatable sleeve 24 so that this movement may be of just sufficient length for cams 33c to cam toggle levers 26 into the Fig. 4 position.

Referring to Figs. 1 and 2, it will be noticed that when the screw driver is moved down so that the end screw of the stick S1 contacts with the threaded aperture T and is driven thereinto, the screw driver moves away from the screw-advancing mechanism and is at this point entirely out of contact with the screw-advancing mechanism. However, after a screw has been driven and the handle H aided by the spring 6 moves the screw driver upwardly, it first contacts with the screw-advancing mechanism and then moves the mechanism so that not only the screw stick S1 carried by the screw driver is advanced, but a second screw stick S2 carried by the screw-advancing mechanism is likewise advanced.

The screw-advancing mechanism will now be described. This mechanism consists of the tubular member 15 which, as above described, is carried by the bracket 14 fixedly with respect to the post 1. As illustrated in Figs. 5 and 6, the sleeve 15 terminates in an upper shoulder 60 and two spaced lower shoulders 61 and 62 which are connected by walls 63 extending axially of the sleeve. Inside the sleeve there is a second tubular member 64 mounted to slide freely therethrough; this sleeve having an enlarged portion 65 with a shoulder 66 adapted to approach or strike shoulder 61 and with a connecting wall 67 adapted to slide against the wall 63, as best shown in Fig. 6, to keep the tubular member 64 from turning. The tubular member 64 preferably has a central bore 68 of a size to slidably receive the screw stick S2 and to hold the screw stick axially of the advancing mechanism. A collar 69 integrally formed or attached to the tubular member 64 may support one end 70 of a spring 71, the other end 72 of which is attached to the tubular member 15. Screws 73 and 74 may be utilized for this purpose.

A collar 75, held in place by a set screw 76, may limit the movement of the tubular member 64 in an axial direction. The spring 71 normally keeps the upper edge 60 of member 15 and the collar 75 in contact, as indicated in Fig. 5.

Section 15 is provided with a slot 77 in which a pawl 78 is hinged on a pin 79. A spring 80 tends to thrust this pawl outwardly at its upper end so that the lower end 81 will be pressed into engagement with one of the screws of the screw stick S2 and so that this pawl will move the screw stick downwardly the length of one screw each time the tubular member 64 moves relative to the section 15. It should be noticed that the enlarged portion 65 of the tubular member 64 is likewise provided with a pawl 82, this pawl being normally spring-pressed into engagement with the screw stick S2 and adapted to lie behind the head 83 of a screw projecting into the recess portion 84 of the screw-advancing mechanism.

The operation of the advancing mechanism is as follows. One of the screws of the screw stick S2 may project into the recess portion 84 of the advancing mechanism or below the lower edge 85 thereof, according to the position of the screw stick S2 in the advancing mechanism. In this position the lowermost screw will be held against moving backwardly by means of the spring pawl 82. After a screw has been driven by the screw driver and the operator moves the handle H upwardly, the handle and the spring 6 cause the upper lock nut 53 to strike or engage the lower edge 85 of the screw-advancing mechanism. Meanwhile, the screw stick S2, being axially arranged with respect to the screw driver, engages the head of the uppermost screw in screw stick S1 which is, of course, coaxially arranged with the screw stick S2. As upward movement of the screw driver nut 53 continues, the tubular member 64 will be moved upwardly against the pressure of spring 71, as shown in Fig. 6, in which position the spring pawl 82 snaps over a screw head as it approaches the holding pawl 81. Thus, when the screw driver is moved downwardly again, and the spring 71 moves the tubular section 64 downwardly, the screw stick S2 is advanced by one screw. The screw stick S2 will advance down through the center bore 68 of the screw-advancing mechanism and down through the center bore of the screw driver until it has completely pushed the screw stick S1 through the driver at which time it will have replaced the screw stick in the screw stick driver and a fresh screw stick may be inserted in the screw-advancing mechanism by merely pushing a fresh screw stick into the bore 68. Thus, in the present form of the invention the screw stick advancing mechanism remains stationary while the screw-driving mechanism moves up and down for moving screws toward the work and since the collet is constantly revolved for driving the lowermost screw into the work.

This form of automatic screw driver for screw sticks has quite a number of advantages, particularly in that it may readily handle screws with round heads and even screws such as shown in Fig. 9 which have heads adapted for countersunk holes.

Fig. 7 shows a typical view of a standard type of screw stick S in which the screw heads 21 lie adjacent a threaded area 90, and between the threaded area and the next-adjacent screw head 21 there is a narrow neck N adapted to be twisted off, such as is referred to in the first two above-mentioned Hutchison patents. These heads may be cylindrical shape or they may have tapered walls with relatively sharp edges as shown at 91 in Fig. 9. The threaded area of these screws 92 is connected by a narrow area 93 to the head 91 of the next-adjacent screw. In Fig. 10, I have shown a screw head 95 which may be either of the type shown in Fig. 7 or Fig. 9, but, in addition, the screw head is provided with one or more spaced notches 96 which are useful, since it enables a spanner tool to be used to remove the screw from work, if necessary. In Fig. 11, the screw head 97 may be provided with flats 98 on opposite sides. In Fig. 12, the screw head 99 may be provided with serrations 100. My improved form of screw driver is designed particularly to drive any one of these types of screw heads and, of course, many more types can be used. It is possible, of course, to drive a multisided screw head since the collet firmly grips the periphery of the head and could contact with the many points between the intersecting sides. However, for polygonal screw heads, it is preferable to employ a screw driver with a complementary-shaped head engaging mechanism, as shown in the last two mentioned Hutchison patents.

It will be noticed with the machine above described that I have provided a means for holding the screw stick in accurate alignment with the axis of the screw-advancing mechanism and of the screw driver. This can be accomplished by allowing just sufficient room for the screw heads to slide freely without room for the screw heads to move a material distance away from the axis, so that the screw head or heads which are engaged by the collet jaws will always be at right angles to the collet jaws and a firm grip can readily be obtained of sufficient strength to turn the screw into the work and break off the head of the screw.

In certain forms of screw heads, such as that shown in Figs. 10 to 12 inclusive, the screw can be removed with a wrench having fixed jaws. However, if a round head, such as that shown in Figs. 8 or 9, is employed, the screw must be removed by means of a tool including movable collet jaws such as those shown in Figs. 3 and 4. This tool, of course, can be a simple one with two relatively moving parts for engaging the edges of a screw head. If the screw is to be placed in a countersunk hole, as might be the case with the screws of Fig. 9, it is, of course, necessary to have some means of removing the screw, such as the Fig. 10 notches, because after the screw has once been inserted, the head is not available for a collet-type of tool.

The operation of my improved form of machine is extremely simple and it may be carried out by relatively unskilled help. After the collet carrying sleeve 24 is put in motion by the source of power in the belt 13, the operator places the work W on the table 2 and with the parts in the position of Fig. 2, merely draws down on the handle H, compressing the counter-balancing spring 6 and bringing the lowermost screw into contact with the threaded aperture T. The downward movement, plus the rapid rotation of the screw, drives it into the hole and breaks off the narrow neck N between the two screws. This operation is carried out at a very high speed and with very little effort on the part of the operator. The operator then raises the handle and with the help of spring 6, the screw driver moves upwardly and at the same time the handle H may be swung to the right of Fig. 1, as shown in Fig. 1; this movement opening the collet for movement of the screw stick S1. The screw stick S1, however, does not move immediately because of the spring arm 45, and it continues to move upwardly until contact between the screw driver and the screw-advancing mechanism occurs. This contact occurs about the time that the screw stick S2 of the screw-advancing mechanism strikes the upper screw of the screw stick S1, and continued upward movement moves the screw-advancing mechanism from the position shown in Fig. 5 to that shown in Fig. 6. This causes the holding pawl 81 to retain the screw stick in one position while the spring pawl 82 moves upwardly a distance sufficient to engage the head of the next-adjacent screw. Therefore, as the cycle is repeated, and the screw driver is moved downwardly, the screw-advancing mechanism screw stick S2 is moved down one length so that upon again repeating the cycle, the screw stick S1 will be advanced by a slight distance.

While it takes some time to describe the cycle of operations, they can actually be carried out with extreme rapidity and a large number of screws can be rapidly driven into work particularly where the proper jigs and fixtures are made to locate the work so that the screws will immediately strike the threaded apertures as the screw driver is lowered. While I have described a preferred embodiment of my invention, it is obvious that various modifications will readily occur to those skilled in the art. I therefore consider as within the scope of my invention all such forms as may come within the scope of the appended claims.

I claim:

1. Mechanism for driving an end screw of a stick of screws in which each screw is connected to the next adjacent screw by a narrow neck and including, in combination, a support, a carriage slidable on the support, a two-part screw driver including a first part rotatably and slidably mounted on the carriage, and a second part rotatably mounted thereon and movable therewith, to move to and from work, a collet forming the screw engaging element of the rotatable screw driver, means for holding the collet in a screw head clamping position, means for releasing the collet to a screw head releasing position and for sliding the screw driver, comprising a crank operably connected to the carriage and first screw driver section for varying the separation therebetween, a handle for moving the crank, said handle also being adapted to move the carriage and screw driver to and from work, and a screw advancing mechanism in axial alignment with the screw driver, positioned for contact with said screw driver when said screw driver is slid upon the support by the handle, the contact being adapted to advance the screw stick held by the driver to position a fresh screw for use therein 2. Mechanism for driving an end screw of a stick of screws in which each screw is connected to the next adjacent screw by a narrow neck and including, in combination, a support, a carriage slidable thereon, a two-part screw driver supported by the carriage, a first part slidably mounted on the carriage, a second screw driver part revolubly carried by the carriage and movable therewith to and from work, a collet forming the screw engaging element of the rotatable screw driver, means for holding the collet in a screw head clamping position, means for releasing the collet from a screw head releasing position and for sliding the screw driver axially, a pivoted crank operably connected to the carriage and first screw driver part for varying the spacing between the parts when turned, a handle for swinging the pivoted crank and for moving the carriage without swinging the crank, and a screw advancing mechanism in axial alignment with the screw driver positioned for contact when said screw driver is slid upon the support by the handle, the contact being adapted to advance the screw stick held by the driver to position a fresh screw for use therein, said screw advancing mechanism comprising a fixedly mounted member and a sliding member, screw head engaging latches on each member, whereby a screw stick in the screw advancing mechanism may advance a screw stick held by the screw driving mechanism when the latter is contacted therewith through operation of the means for sliding the screw driver.

3. Mechanism for driving an end screw of a stock of screws in which each screw is connected to the next adjacent screw by a narrow neck and including, in combination, a support, a carriage slidable thereon, a two-part screw driver, a first screw driver part rotatably and slidably mounted on the carriage, a second screw driver part rotatably mounted on the carriage and movable therewith to move to and from work, a collet forming the screw engaging element of the rotatable screw driver, means for holding the collet in a screw head clamping position, means for releasing the collet to a screw head releasing position and for sliding the first screw driver part, comprising a crank pivotally mounted and operably engaging the carriage and first screw driver section for varying the space therebetween and a screw advancing mechanism in axial alignment with the screw driver, the screw advancing mechanism comprising two relatively moveable sections, one fixedly mounted in the base, the other having limited movement with respect to the fixedly mounted section, a screw stick detent comprising a spring pawl normally engaging a screw stick head on each section for engaging and advancing a screw stick at each movement of the second section relative to the first, said advancing screw stick being in axial alignment with a screw stick in the screw driver to move the latter by the former each time the screw driver is slid from the work, and into contact with the screw advancing mechanism means inside the collet for retaining a screw stick in the driver in a position to be engaged by the collet.

4. Mechanism of the type defined in claim 3 characterized in that the screw driver includes a means for resiliently engaging and holding the screw stick therein in the advanced position and in that said means prevents movement of the screw stick in a reverse direction.

5. Mechanism of the type defined in claim 3 characterized in that the screw driver includes a spring pawl positioned to engage a head of the advanced screw stick to hold the screw stick against reverse movement as the screw driver drives an end screw of the screw stick into work.

6. Mechanism of the type defined in claim 3 characterized in that the screw drive includes a demountable sleeve having an internal bore of a size to fit the screw stick heads with free sliding fit.

7. Mechanism of the type defined in claim 3 characterized in that the screw drive includes a means for holding the screw stick at right angles to the screw head engaging collet whereby the collet may engage a screw head which will be held against non-axial movement irrespective of the shape of the screw head.

8. Mechanism for driving an end screw of a stick of screws in which each screw is connected to the next adjacent screw by a narrow neck, and including, in combination, a support having a slideway thereon, a carriage movable in the slideway, a two-part screw driver, a first part of which is slidably and rotatably mounted on the carriage, and a second screw driver part, power means for rotating the screw driver, a pivotally mounted crank operatively connected to the carriage and the movable part of the screw driver for movement to cause said carriage and screw driver part to move positively to and from each other, a handle on the crank for swinging the crank to vary the separation between the movable part of the screw driver and carriage, said handle also being adapted for movement without swinging to move the carriage and the movable part of the screw driver together to and from work, a collet forming the screw head engaging member of the screw driver, said collet including inner and outer cam surfaces, the former including spring fingers, the spring fingers being engageable with a screw head by forcing the cams one against the other, and mechanism operable by swinging the crank for forcing the collet into holding engagement with the screw head.

9. The mechanism for driving an end screw of a stick of screws as defined in claim 8 characterized in that said crank may be swung in an opposite direction to release the mechanism for engaging the screw head.

10. The mechanism for driving an end screw of a stick of screws as defined in claim 8 characterized in that said screw driver includes a screw stick holding sleeve, a spring pawl therein, the mechanism including a fixed member adapted to engage and move the screw stick past the spring pawl as the crank is moved upwardly and swung by the handle as the carriage and screw driver are moved from the work.

11. The mechanism for driving an end screw of a stick of screws as defined in claim 8 characterized in that the pivotally mounted crank operative connection between the carriage and screw driver which consists of two parts comprises the said pivotal mount for the crank on one part and a cam on the crank engaging a cam follower on the other part whereby the movement of one part relative to the other part my be definitely controlled by the cam and cam follower.

12. The mechanism for driving an end screw of a stick of screws as defined in claim 8 characterized in that the pivotally mounted crank operative connection between the carriage and screw driver which consists of two parts comprises the said pivotal mount for the crank on one part and a cam on the crank engaging a cam follower on the other part whereby the movement of one part relative to the other part may be definitely controlled by the cam and cam follower, the crank and handle and cam and cam follower being movable with or without swinging movement of the handle when the carriage and screw driver may move in fixed or varying relationship.

13. The mechanism for driving an end screw of a stick of screws as defined in claim 8 characterized in that the second part of the screw driver is rotatably carried by the carriage to move therewith to and from work.

14. The mechanism for driving an end screw of a stick of screws as defined in claim 8 characterized in that the second part of the screw driver is rotatably carried by the carriage to move therewith to and from work, the first and second screw driver parts being relatively slidable, toggle links engaging the first and second parts, annular grooves for holding the ends of the toggles, and cam walls in at least one of the annular grooves for moving the toggle links toward a straight clamping position when the handle is swung to vary the separation between the carriage and first screw driver part.

15. The mechanism for driving an end screw of a stick of screws as defined in claim 8 characterized in that the second part of the screw driver is rotatably carried by the carriage, said handle when swung in an opposite direction releasing the toggles from their straight clamping position, and a relatively fixed abutment coaxially arranged with respect to the screw driver against which the screw stick may be moved when the handle is moved to move the carriage and screw driver away from work.

16. Mechanism for driving an end screw of a stick of screws in which each screw is connected to the next adjacent screw by a narrow neck, and including, in combination, a support having a slideway thereon, a carriage movable on the slideway, a two-part screw driver carried by the slideway, a first part slidably and rotatably supported by the carriage and a second part rotatably but not slidably carried thereby, a crank operatively connected to the carriage and first screw driver part to vary the distance between the two screw driver parts when swung through an arc, a handle for moving the crank, said handle and crank also serving to move the carriage on the slideway without swinging the handle through an arc, mechanism in the screw driver for clamping the screw stick and mechanism for preventing movement of the screw stick in one direction and allowing movement in the other direction, a bracket fixedly carried by the support, a screw-advancing mechanism carried by the bracket, said screw-advancing mechanism being positioned to be struck by the first screw driver section when the carriage is moved on the slideway in one direction by the handle.

CHESTER WILLIAM MICHATEK.

REFERENCES CITED

The following references are of record in the file of this patent:

UNITED STATES PATENTS

| Number | Name | Date |
|---|---|---|
| 1,478,020 | Butler | Dec. 18, 1923 |
| 2,106,365 | Tiano | Jan. 25, 1938 |
| 2,247,500 | Hutchison | July 1, 1941 |
| 2,322,024 | Hutchison | June 15, 1943 |
| 2,327,795 | Hutchison | Aug. 24, 1943 |
| 2,327,796 | Hutchison | Aug. 24, 1943 |